United States Patent
Hodson et al.

(10) Patent No.: US 10,218,841 B2
(45) Date of Patent: Feb. 26, 2019

(54) MICROPHONE MONITORING AND ANALYTICS

(71) Applicant: Avaya Inc., Santa Clara, GA (US)

(72) Inventors: Jeffrey D. Hodson, San Jose, CA (US);
John H. Yoakum, Cary, NC (US);
Tony McCormack, Galway (IE)

(73) Assignee: Avaya Inc., Santa Clara, CA (US)

( * ) Notice: Subject to any disclaimer, the term of this patent is extended or adjusted under 35 U.S.C. 154(b) by 257 days.

(21) Appl. No.: 14/755,856

(22) Filed: Jun. 30, 2015

(65) Prior Publication Data

US 2017/0006158 A1   Jan. 5, 2017

(51) Int. Cl.
*H04M 3/42* (2006.01)
*H04M 3/51* (2006.01)
*H04M 3/22* (2006.01)

(52) U.S. Cl.
CPC ..... *H04M 3/42221* (2013.01); *H04M 3/5175* (2013.01); *H04M 3/2218* (2013.01); *H04M 2203/401* (2013.01)

(58) Field of Classification Search
CPC .................................................. H04M 3/42221
See application file for complete search history.

(56) References Cited

U.S. PATENT DOCUMENTS

| | | | | |
|---|---|---|---|---|
| 8,918,459 B2* | 12/2014 | Smyth | ................... | H04L 12/581 370/260 |
| 2005/0141694 A1* | 6/2005 | Wengrovitz | ........ | H04M 3/5191 379/265.09 |
| 2008/0162701 A1* | 7/2008 | Ryabchun | ................ | H04L 51/04 709/227 |
| 2009/0327441 A1* | 12/2009 | Lee | ........................ | H04L 51/043 709/206 |
| 2012/0053990 A1* | 3/2012 | Pereg | ..................... | G06Q 10/06 705/7.31 |
| 2012/0057691 A1* | 3/2012 | Moran | .............. | H04M 3/42221 379/265.02 |
| 2014/0098948 A1* | 4/2014 | Kulkarni | ............... | H04L 51/046 379/265.03 |
| 2014/0282083 A1* | 9/2014 | Gaetano, Jr. | ............ | H04L 51/04 715/752 |
| 2015/0378577 A1* | 12/2015 | Lum | ...................... | G06Q 10/10 715/720 |
| 2015/0381807 A1* | 12/2015 | Konig | .............. | G06Q 10/06311 379/265.06 |
| 2016/0073185 A1* | 3/2016 | Kannappan | .............. | H04R 3/00 381/150 |
| 2016/0212073 A1* | 7/2016 | Kulkarni | ............... | H04L 51/046 |

* cited by examiner

*Primary Examiner* — Joseph T Phan
(74) *Attorney, Agent, or Firm* — Sheridan Ross P.C.

(57) ABSTRACT

Microphone monitoring and analytics are provided. An initiation of a new contact session is determined that includes a communication interaction between a contact center agent (CCA) having a microphone and a contacting individual (CI). Prior to an end of the new contact session, a non-audio mode wherein audio signals received by the microphone are not communicated to the CI is determined. Audio signals received via the microphone during the non-audio mode are analyzed. An utterance spoken by the CCA is identified. Contact session metadata is generated based on the utterance. A contact session record that includes the contact session metadata is generated. The contact session record is stored.

20 Claims, 5 Drawing Sheets

FIG. 5

MICROPHONE MONITORING AND ANALYTICS

TECHNICAL FIELD

The embodiments relate to monitoring a microphone of a contact center agent during periods of time that the contact center agent is not utilizing the microphone to converse with a contacting individual.

BACKGROUND

Contact centers provide support and other services to individuals who contact the contact center. A contact center typically utilizes an electronic contact center system (CCS) to implement certain functionalities of the contact center. When a contacting individual (CI) contacts a contact center, the CCS initiates a new contact center session and routes the CI to an available contact center agent (CCA). The CCS, or the CCA via the CCS, may generate a contact center record that will be used to capture information about the contact center session. The contact center record may be stored in the CCS and subsequently analyzed, and/or used to maintain a history regarding a particular problem, or a particular CI.

A CCA often utilizes a microphone or other audio input device in the performance of her duties. The audio input device may be utilized, for example, to engage in a conversation with the CI. When the CCA is not engaging in an audio conversation with the CI, such as after the CCA has terminated or suspended the audio conversation with the CI, the microphone is not used by the CCA, but continues to capture sounds.

Contact centers increasingly utilize multiple communication modes for interacting with CIs. For example, as discussed previously, a CCA may engage in an audio conversation with a CI. Alternatively, a CCA may utilize a non-audio communication mode, such as a chat or email session to communicate with the CI. The microphone is not utilized by the CCA to converse with the CI during a non-audio communication mode, but can be capable of continuing to capture sounds. In other alternatives, video streams may be communicated from either the CCA to the CI, the CI to the CCA, or between the CI and the CCA, and audio may or may not be directly associated with one or more of the video streams.

SUMMARY

The embodiments relate to mechanisms for analyzing audio signals received via a microphone during periods of time that a contact center agent (CCA) is not utilizing the microphone to converse with a contacting individual (CI). In one embodiment, utterances spoken by the CCA may be identified, and session metadata is generated based on the utterances. The session metadata is stored in a contact session record, and may be used in a wide variety of different applications.

In one embodiment, an initiation of a new contact session is determined that includes a communication interaction between a contact center agent (CCA) having a microphone and a contacting individual (CI). Prior to an end of the new contact session, a non-audio mode, wherein audio signals received by the microphone are not communicated to the CI, is determined. Audio signals received via the microphone during the non-audio mode are analyzed. An utterance spoken by the CCA is identified. Contact session metadata is generated based on the utterance. A contact session record that includes the contact session metadata is generated. The contact session record is stored.

In one embodiment, the initiation of an audio interaction mode wherein the CCA and the CI engage in an interactive audio communication session is determined, a termination or suspension of the interactive audio communication session is determined, and the non-audio mode is determined based on the termination or suspension of the interactive audio communication session.

In one embodiment, the analysis of audio signals received via the microphone during the audio interaction mode is inhibited.

In one embodiment, the audio interaction mode comprises video imagery that depicts at least one of the CCA and the CI.

In one embodiment, the interactive communication session mode comprises one of a chat communication session mode and an email communication session mode.

In one embodiment, the utterance spoken by the CCA is identified as a predetermined subsequent action command. A post contact action indicator is inserted in the contact session metadata and the predetermined subsequent action command is identified in the contact session metadata.

In one embodiment, the predetermined subsequent action command comprises a review contact session command. The contact session record is processed, and it is determined that the contact session metadata identifies the review contact session command. A message is sent to a destination. The message identifies the contact session record and the predetermined subsequent action command.

In one embodiment, the utterance spoken by the CCA is identified as a predetermined recording command. An audio recording of the audio signals received via the microphone during at least a portion of the non-audio mode is generated and stored in the contact session metadata.

In one embodiment, the utterance spoken by the CCA is identified as a profanity. A profanity flag is inserted in the contact session metadata.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps.

The embodiments relate to mechanisms for analyzing audio signals received via a microphone during periods of time that a contact center agent (CCA) is not utilizing the microphone to converse with a contacting individual (CI). In one embodiment, utterances spoken by the CCA may be identified, and session metadata is generated based on the utterances. The session metadata is stored in a contact session record, and may be used in a wide variety of different applications.

Figure 1:
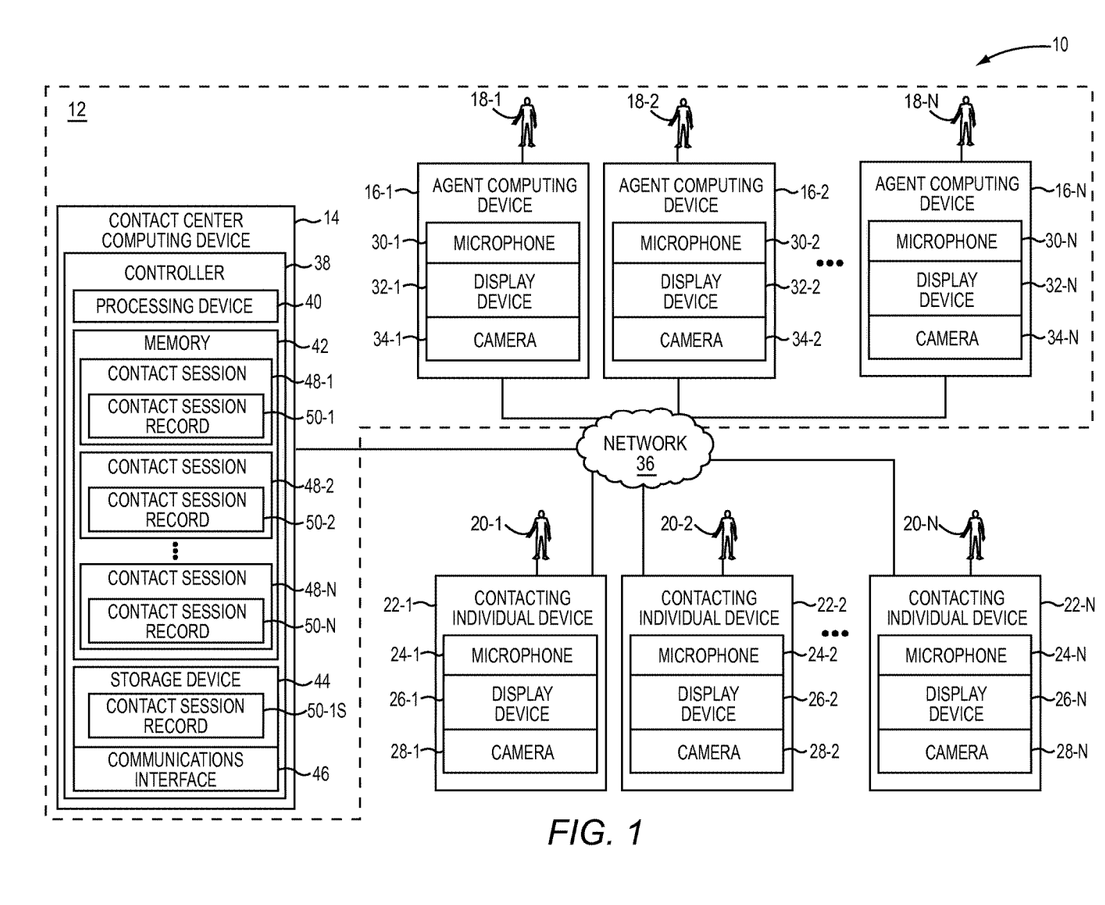
FIG. 1 is a block diagram of an environment in which embodiments may be practiced.

FIG. 1 is a block diagram of an environment 10 in which embodiments may be practiced. The environment 10 includes a contact center 12, a contact center computing device (CCCD) 14 and a plurality of agent computing devices 16-1-16-N (generally, agent computing devices 16). A plurality of CCAs 18-1-18-N (generally, CCAs 18) provide support and/or other services to CIs 20-1-20-N (generally, CIs 20) via the corresponding agent computing devices 16. The CIs 20 typically interact with the CCAs 18 via corresponding contacting individual devices 22-1-22-N (generally, contacting individual devices 22). In some embodiments, the contacting individual devices 22 may comprise phones, such as a landline phone, a smartphone, or the like. In other embodiments, the contacting individual devices 22 may comprise laptop or desktop computers. The contacting individual devices 22 may be equipped, in some embodiments, with corresponding microphones 24-1-24-N via which the CIs 20 may engage in audio communications with the CCAs 18. The contacting individual devices 22 may also include display devices 26-1-26-N via which the CIs 20 may receive imagery of a CCA 18 during a communication session that involves video. The display devices 26-1-26-N may also be used to engage in non-audio communication sessions with the CCAs 18, such as chat and/or email communication sessions, in conjunction with an input device, such as a keyboard (not illustrated). The contacting individual devices 22 may also include cameras 28-1-28-N to facilitate two-way video communications between the CIs 20 and the CCAs 18.

Similarly, the agent computing devices 16 may include corresponding microphones 30-1-30-N via which the CCAs 18 may engage in audio communications with the CIs 20. The agent computing devices 16 may also include display devices 32-1-32-N via which the CCAs 18 may receive imagery of a respective CI 20 during a communication session that involves video. The display devices 32-1-32-N may also be used to engage in non-audio communication sessions with the CIs 20, such as chat and/or email communication sessions. The contacting individual devices 22 may also include cameras 34-1-34-N to facilitate two-way video communications between the CCAs 18 and the CIs 20.

The CCCD 14, agent computing devices 16, and contacting individual devices 22 may communicate with one another via one or more networks 36.

The CCCD 14 includes a controller 38 which includes a processing device 40 and a memory 42. A storage device 44 may be utilized to store data, and a communications interface 46 is configured to communicate with the network 36, thereby facilitating communication with the agent computing devices 16 and the contacting individual devices 22.

Figure 2:
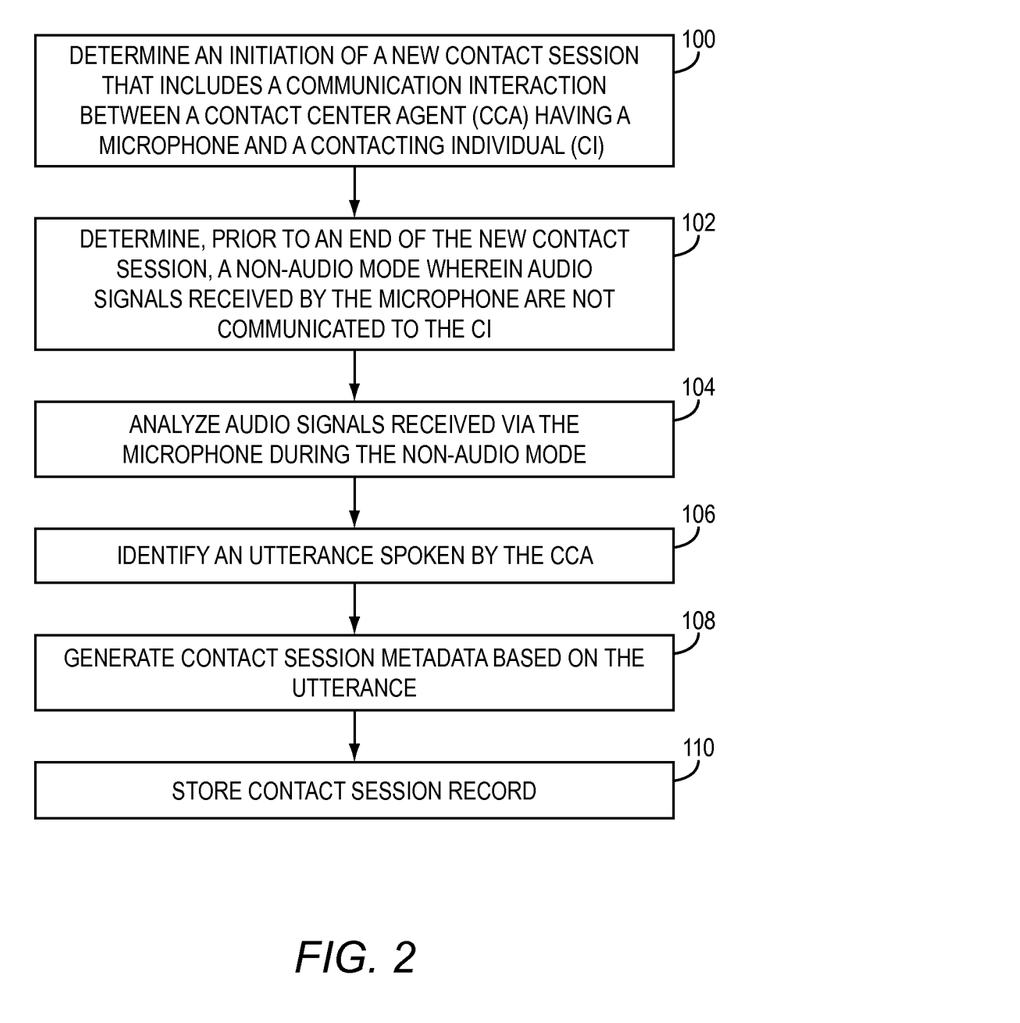
FIG. 2 is a flowchart of a method according to one embodiment.

FIG. 2 is a flowchart of a method according to one embodiment, and will be discussed in conjunction with FIG. 1. For purposes of illustration, an example scenario will be discussed herein with regard to the CI 20-1 and the CCA 18-1, but it should be appreciated that the method described herein can happen any number of times with any number of different CIs 20 and CCAs 18. Also for purposes of illustration, it will be assumed that the contacting individual device 22-1 is a smartphone and that the CI 20-1 contacts the contact center 12 via a cellular phone call. Thus, the CI 20-1 places a phone call to the contact center 12. The CCCD 14 receives the call, and may present the CI 20-1 with one or more interactive voice selections whereby the CI 20-1 identifies a particular area of support needed by the CI 20-1. The CCCD 14 ultimately connects the contacting individual device 22-1 to the agent computing device 16-1 so that the CCA 18-1 can provide support to the CI 20-1. The CCCD 14 determines an initiation of a new contact session 48-1 (FIG. 1) that includes a communication interaction between the CCA 18-1 and the CI 20-1 (FIG. 2, block 100). The CCA 18-1 and the CI 20-1 engage in an interactive audio communication session wherein the CCA 18-1 and the CI 20-1 converse with one another for a period of time via the microphones 30-1, 24-1, respectively. The CCCD 14 may identify this period of time as an audio interaction mode of the contact session 48-1 based on the fact that the CI 20-1 initiated the contact with the contact center 12 via audio.

At some point in time during the contact session 48-1, the interactive audio communication session between the CCA 18-1 and the CI 20-1 ends, such that the CI 20-1 no longer receives audio signals received by the microphone 30-1. For example, the CCA 18-1 may have provided suitable support to the CI 20-1, and the CI 20-1 may have ended the phone call. The CCCD 14 determines that the contact session 48-1 is now in a non-audio mode wherein audio signals received by the microphone 30-1 are not communicated to the CI 20-1 (FIG. 2, block 102).

Although the microphone is not utilized by the CCA 18-1 to communicate with the CI 20-1, the microphone 30-1 continues to receive audio signals of the CCA 18-1. The CCCD 14 begins to analyze the audio signals received via the microphone 30-1 during the non-audio mode (FIG. 2, block 104). The CCCD 14 identifies an utterance spoken by the CCA 18-1 (FIG. 2, block 106). The utterance may comprise a single word, or a plurality of words, such as a phrase. The utterance may be identified as, for example, a subsequent action command, a recording command, a profanity, or the like. The CCCD 14 generates contact session metadata (not illustrated) based on the utterance (FIG. 2, block 108). The CCCD 14 also generates a contact session record 50-1 that includes the contact session metadata. The CCCD 14 stores the contact session record 50-1 as a contact session record 50-1S in the storage device 44 for subsequent analysis (FIG. 2, block 110).

Referring to FIG. 1 again, note that the CCCD 14 may similarly generate a contact session 48-2 and contact session record 50-2 to record information associated with support of the CI 20-2 by the CCA 18-2, and a contact session 48-N and contact session record 50-N to record information associated with support of the CI 20-N by the CCA 18-N.

Figure 3:
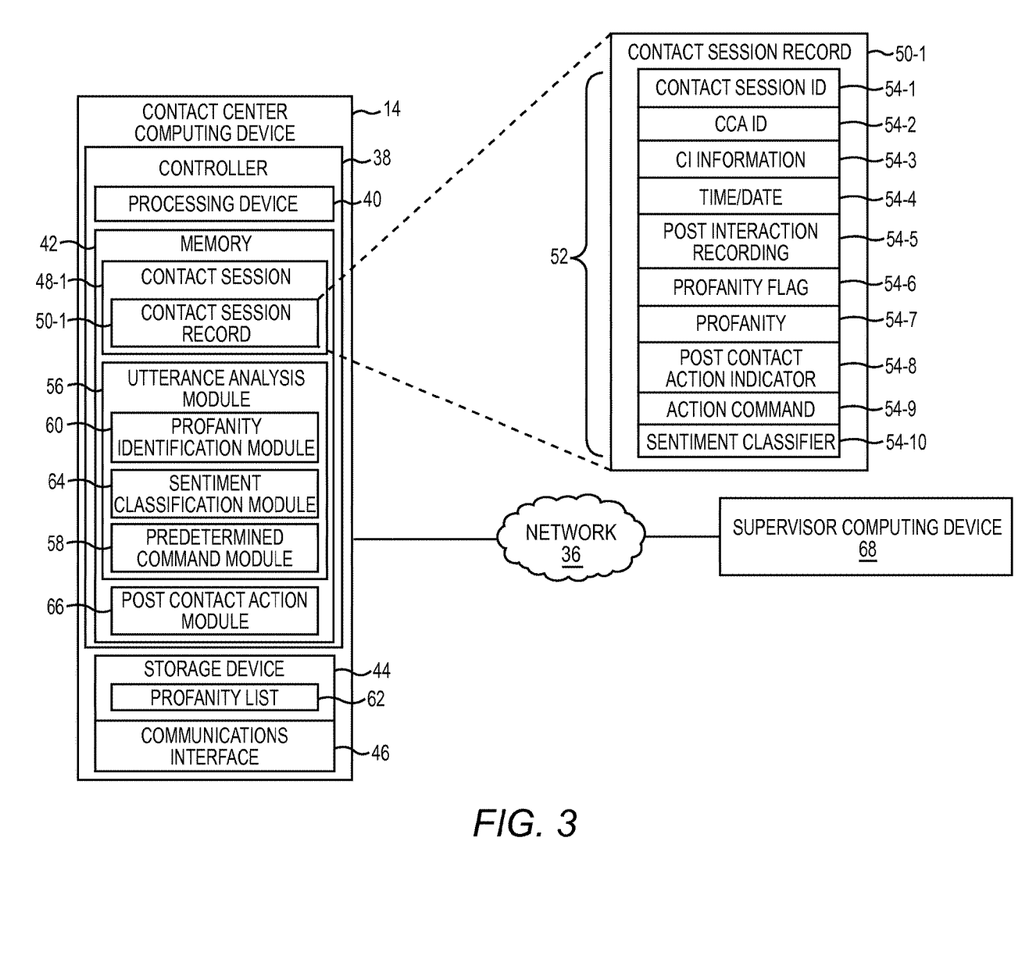
FIG. 3 is a block diagram of a contact center computing device illustrated in FIG. 1 that illustrates additional aspects of the contact center computing device according to one embodiment.

FIG. 3 is a block diagram of the CCCD 14 that illustrates additional aspects of the CCCD 14 according to one embodiment. For purposes of illustration, certain components of the CCCD 14 illustrated in FIG. 1 have been omitted in FIG. 3. The contact session record 50-1 includes contact session metadata 52. The contact session metadata 52 comprises information collected or determined during the contact session 48-1 which may be desirable to retain for subsequent analysis and/or use. The contact session metadata 52 may include a contact session identifier (ID) field 54-1 that comprises a unique contact session ID that uniquely identifies the contact session 48-1. A CCA ID field 54-2 contains a CCA ID that uniquely identifies the CCA 18-1 as the CCA 18 who handled the contact session 48-1. A CI information field 54-3 may contain information regarding the CI 20-1, such as name, address, gender, age, and the like. A time/date field 54-4 contains information that identifies the date and time that the contact session 48-1 occurred.

In one embodiment, the CCCD 14 includes an utterance analysis module 56 that operates to analyze utterances of the CCA 18-1 when the contact session 48-1 is in the non-audio mode. In one embodiment, the utterance analysis module 56 includes a predetermined command module 58 that analyzes the utterances for predetermined commands. The predetermined commands may comprise any suitable commands, such as, by way of non-limiting example, a predetermined recording command, wherein upon detection of the predetermined recording command the CCCD 14 begins recording the audio signals of the CCA 18-1 and generates a post interaction recording 54-5. The post interaction recording 54-5 may comprise any comments that the CCA 18-1 deems appropriate for recording, and may be used in conjunction with other predetermined commands to provide context for subsequent analysis, such as by a supervisor.

In another embodiment, the predetermined command may be a predetermined subsequent action command that indicates that the CCCD 14 should take an additional action after the end of the contact session 48-1. For example, the predetermined subsequent action command may comprise a review contact session command that directs the CCCD 14 to identify the contact session 48-1 to a reviewer, such as a supervisor, after the end of the contact session 48-1. Upon identification of a predetermined subsequent action command, the CCCD 14 may set a post contact action indicator 54-8 that indicates that a predetermined subsequent action command has been identified. The CCCD 14 may identify the particular predetermined subsequent action command in an action command field 54-9.

The utterance analysis module 56 may also include a profanity identification module 60 that identifies profanities uttered by the CCA 18-1. In one embodiment, the profanity identification module 60 may utilize a profanity list 62 to identify profanities uttered by the CCA 18-1. Upon detection of a profanity, the utterance analysis module 56 may insert, such as by setting to a value of TRUE, a profanity flag 54-6 on the contact session metadata 52. The utterance analysis module 56 may also generate contact session metadata 52 that identifies the particular profanity in a profanity field 54-7.

In one embodiment, the utterance analysis module 56 may include a sentiment classification module 64 that operates to analyze the audio signals of the CCA 18-1 and to determine a sentiment, such as a positive or a negative sentiment, of the CCA 18-1. Sentiment may be identified in any number of ways, including, for example, via stress levels detected in the audio signals, words spoken by the CCA 18-1, tone or volume of the audio signals, and the like. The sentiment classification module 64 may classify the sentiment, for example, as negative or positive, and identify the classification in a sentiment classifier field 54-10 of the contact session metadata 52.

Assume for purposes of illustration that the CCA 18-1, during the non-audio mode, uttered a predetermined review contact session command. The CCCD 14 identifies the predetermined review contact session command and sets the post contact action indicator 54-8 to a value of TRUE. The CCCD 14 also identifies the predetermined review contact session command in the action command field 54-9.

After the end of the contact session 48-1, a post contact action module 66 analyzes the contact session metadata 52. The post contact action module 66 determines that the post contact action indicator 54-8 is set, indicating that a predetermined subsequent action command was identified. The post contact action module 66 accesses the action command field 54-9 and determines that the predetermined subsequent action command comprises a review contact session command. The CCCD 14 accesses organization information (not illustrated) and determines a supervisor of the CCA 18-1. The CCCD 14 sends a message to a supervisor computing device 68 associated with the supervisor. The message identifies the contact session record 50-1, and information that indicates the CCA 18-1 requested that the contact session record 50-1 be reviewed.

Figure 4:
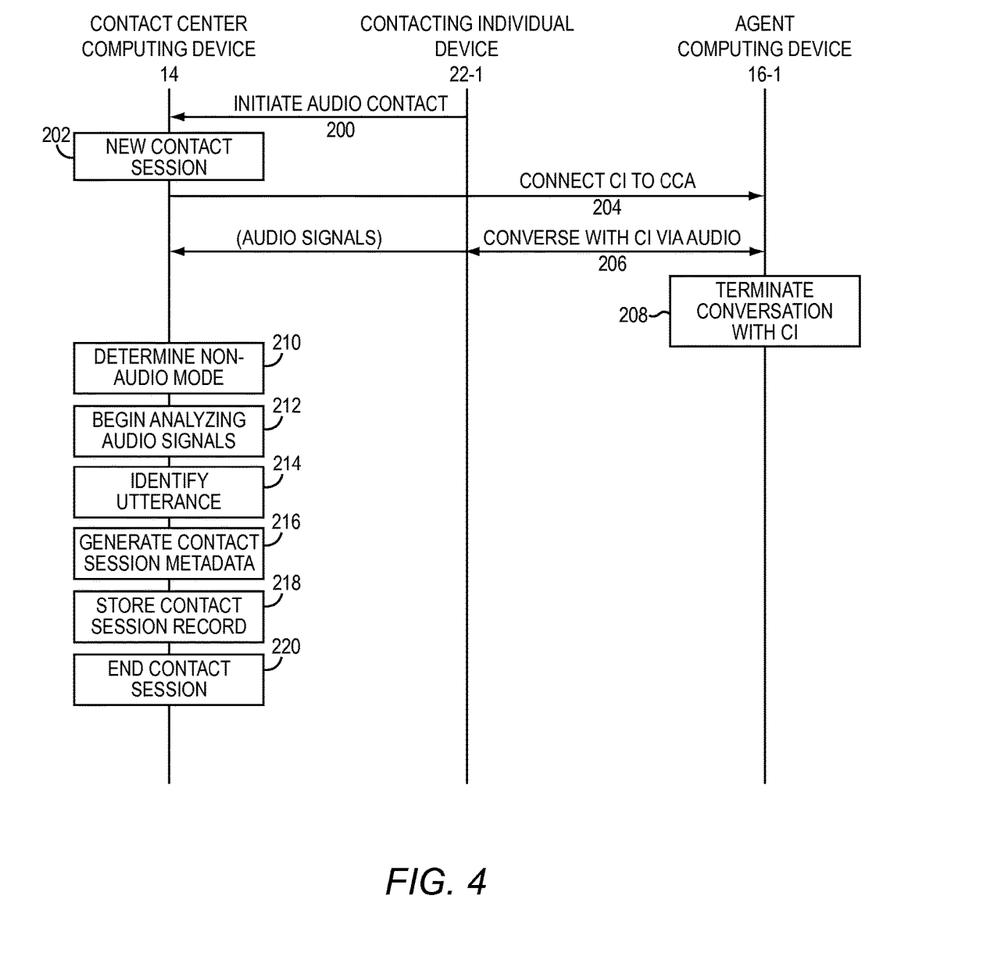
FIG. 4 is a message flow diagram illustrating an example sequence of messages in a contact session according to one embodiment.

FIG. 4 is a message flow diagram illustrating an example sequence of messages in a contact session according to one embodiment. Assume that the CI 20-1 (not illustrated) contacts the CCCD 14 in an audio communication mode via the contacting individual device 22-1 (step 200). The CCCD 14 initiates a new contact session (step 202). The CCCD 14 connects the CI 20-1 to the CCA 18-1 (not illustrated) via the agent computing device 16-1 (step 204), and determines that the contact session is in an audio interaction mode wherein the CCA 18-1 and the CI 20-1 engage in an interactive audio communication session. The agent computing device 16-1 and the contacting individual device 22-1 exchange audio signals of the CCA 18-1 and the CI 20-1 (step 206). The audio signals may be provided to the CCCD 14. In one embodiment, the CCCD 14 inhibits the analysis of the audio signals received via the microphone 30-1 during the audio interaction mode. At some point in time during the contact session 48-1, the CCA 18-1 terminates or suspends the conversation with the CI 20-1 (step 208). The suspension may comprise, for example, putting the CI 20-1 in a hold state. The CCCD 14 determines that the contact session has entered a non-audio mode wherein audio signals received by the microphone 30-1 are not communicated to the CI 20-1 (step 210). The CCCD 14 begins analyzing the audio signals received from the microphone 30-1 (step 212). The CCCD 14 identifies an utterance of the CCA 18-1 (step 214). The CCCD 14 generates contact session metadata 52 based on the utterance (step 216). The CCCD 14 stores the contact session record 50-1 in the storage device 44 (step 218). The CCCD 14 ends the contact session 48-1 (step 220).

Figure 5:
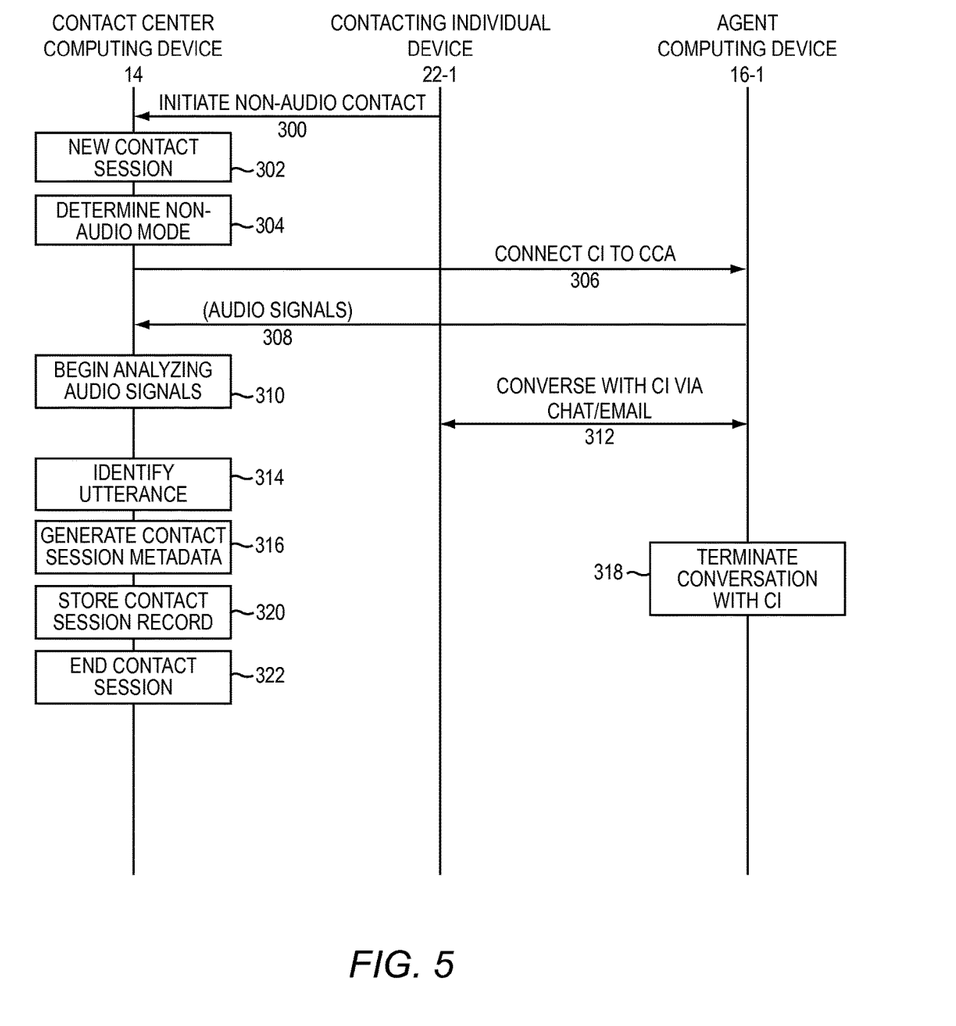
FIG. 5 is a message flow diagram illustrating an example sequence of messages in a contact session according to another embodiment.

FIG. 5 is a message flow diagram illustrating an example sequence of messages in a contact session according to another embodiment. Assume that the CI 20-1 (not illustrated) contacts the CCCD 14 in a non-audio communication mode via the contacting individual device 22-1, such as via a chat session (step 300). The CCCD 14 initiates a new contact session (step 302). The CCCD 14 determines that the contact session is in the non-audio mode based on the non-audio communication mode utilized by the CI 20-1 to contact the CCCD 14 (step 304). The CCCD 14 connects the CI 20-1 to the CCA 18-1 (not illustrated) via the agent computing device 16-1 (step 306). Concurrently, the microphone 30-1 receives audio signals of the CCA 18-1 that are not provided to the CI 20-1, but which are provided to the CCCD 14 (step 308). The CCCD 14 analyzes the audio signals received from the microphone 30-1 (step 310). The agent computing device 16-1 and the contacting individual device 22-1 exchange chat messages (step 312). The CCCD 14 identifies an utterance of the CCA 18-1 (step 314). The CCCD 14 generates contact session metadata 52 based on the utterance (step 316). At some point in time during the contact session 48-1, the CCA 18-1 terminates the chat session conversation with the CI 20-1 (step 318). The CCCD 14 stores the contact session record 50-1 in the storage device 44 (step 320). The CCCD 14 ends the contact session 48-1 (step 322).

The embodiments facilitate a wide range of analytics that may be performed based on the contact session metadata 52 in addition to that discussed above. For example, casual comments by the CCA 18-1 to other CCAs 18 about contact sessions 48 as well as questions to other CCAs 18 could be analyzed in relation to recent contact sessions 48 or the contact sessions 48 in their current shift. Various patterns of agent behavior and performance could be associated with the contact sessions 48 that may have caused those patterns. Overall agent attitude as projected outside of contact sessions 48 could be correlated with agent performance in the contact session 48 or in some other timeframe. Impact on the performance of one CCA 18 as it relates to interactions with other CCAs 18 could be characterized. Other analytics are possible, and only a brief set are provided herein for illustrative purposes.

CCAs 18 may easily tag a contact session 48 with specific verbal tags characterizing many aspects of the contact session 48. A CCA 18 may request that a contact session 48 be reviewed by a supervisor while easily and quickly providing their comments on what to look for and their personal feedback. For example, the CCA 18 may state "please review how I was treated on this call as it felt like I was disrespected while I tried hard to help the customer".

Referring again to FIG. 1, the CCCD 14 may comprise any computing or processing device capable of including firmware, hardware, and/or executing software instructions to implement the functionality described herein. The processing device 40 can be any commercially available or proprietary processor. A number of modules can be stored in the storage device 44, including an operating system and one or more program modules, which may implement the functionality described herein in whole or in part.

All or a portion of the embodiments may be implemented as a computer program product stored on a transitory or non-transitory computer-usable or computer-readable storage medium, such as the storage device 44, which may include complex programming instructions, such as complex computer-readable program code, configured to cause the processing device 40 to carry out the steps described herein. Thus, the computer-readable program code can comprise software instructions for implementing the functionality of the embodiments described herein when executed on the processing device 40.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    determining, by a computing device comprising a processing device, an initiation of a new contact session that includes a communication interaction between a contact center agent (CCA) having a microphone and a contacting individual (CI);
    determining, prior to an end of the new contact session, a non-audio mode, wherein audio signals received by the microphone are not communicated to the CI;
    analyzing audio signals received via the microphone during the non-audio mode;
    identifying, based on analyzing the audio signals received via the microphone, an utterance spoken by the CCA and indicating one of a plurality of commands related to the contact session, the plurality of commands comprising a predetermined recording command and a predetermined subsequent action command, wherein the predetermined recording command comprises a command to generate a post interaction recording of audio signals, and wherein the predetermined subsequent action command comprises a command to take an identified additional action after an end of the communication interaction;
    generating contact session metadata based on and including the recording command or the subsequent action command indicated by the identified utterance;
    generating a contact session record that includes the contact session metadata; and
    storing the contact session record.

2. The method of claim 1, wherein determining the non-audio mode further comprises:
    determining the initiation of an audio interaction mode wherein the CCA and the CI engage in an interactive audio communication session;
    determining a termination or suspension of the interactive audio communication session; and
    determining the non-audio mode based on the termination or suspension of the interactive audio communication session.

3. The method of claim 2, further comprising:
    inhibiting the analysis of audio signals received via the microphone during the audio interaction mode.

4. The method of claim 2, wherein the audio interaction mode comprises video imagery that depicts at least one of the CCA and the CI.

5. The method of claim 1, wherein determining the non-audio mode further comprises:
    determining that an interactive communication session mode between the CCA and the CI utilizes communications other than audio communications.

6. The method of claim 5, wherein the interactive communication session mode comprises one of a chat communication session mode and an email communication session mode.

7. The method of claim 1, wherein:
    the command indicated by the identified utterance comprises the predetermined subsequent action command; and
    generating the contact session metadata based on the command further comprises inserting a post contact action indicator in the contact session metadata and identifying in the contact session metadata the predetermined subsequent action command.

8. The method of claim 7, wherein the predetermined subsequent action command comprises a review contact session command comprising a command to identify the communication interaction to a reviewer, the method further comprising:
    processing the contact session record;

determining that the contact session metadata identifies the review contact session command; and sending a message to a destination associated with the reviewer, the message identifying the contact session record and the predetermined subsequent action command.

9. The method of claim 7, wherein the predetermined subsequent action command comprises a review contact session command comprising a command to identify the communication interaction to a reviewer, the method further comprising:

processing the contact session record;

determining that the contact session metadata comprises the post contact action indicator; and sending a message to a destination associated with the reviewer, the message identifying the contact session record and the predetermined subsequent action command.

10. The method of claim 1, wherein:

the command indicated by the identified utterance comprises the predetermined recording command; and generating the contact session metadata based on the utterance further comprises generating an audio recording of the audio signals received via the microphone during at least a portion of the non-audio mode.

11. The method of claim 1, wherein:

identifying the utterance spoken by the CCA comprises identifying the utterance spoken by the CCA as a profanity; and generating the contact session metadata based on the utterance comprises inserting a profanity flag in the contact session metadata.

12. The method of claim 1, wherein:

identifying the utterance spoken by the CCA comprises identifying a plurality of words spoken by the CCA; and further comprises determining, based on the plurality of words, a sentiment classifier that classifies a sentiment of the CCA; and generating the contact session metadata based on the utterance comprises inserting the sentiment classifier in a sentiment classification field of the contact session metadata.

13. The method of claim 12, wherein the sentiment classifier classifies the sentiment as at least one of a positive sentiment and a negative sentiment.

14. A system comprising:

a contact center computing device comprising:

a communications interface configured to communicate with a network; and a controller comprising a processing device, the controller coupled to the communications interface and configured to:

determine an initiation of a new contact session that includes a communication interaction between a contact center agent (CCA) having a microphone and a contacting individual (CI);

determine, prior to an end of the new contact session, a non-audio mode, wherein audio signals received by the microphone are not communicated to the CI;

analyze audio signals received via the microphone during the non-audio mode;

identify, based on analyzing the audio signals received via the microphone, an utterance spoken by the CCA and indicating one of a plurality of commands related to the contact session, the plurality of commands comprising a predetermined recording command and a predetermined subsequent action command, wherein the predetermined recording command comprises a command to generate a post interaction recording of audio signals, and wherein the predetermined subsequent action command comprises a command to take an identified additional action after an end of the communication interaction;

generate contact session metadata based on and including the recording command or the indicated subsequent action command indicated by the identified utterance;

generate a contact session record that includes the contact session metadata; and store the contact session record.

15. The system of claim 14, wherein to determine the non-audio mode the controller is further configured to:

determine the initiation of an audio interaction mode wherein the CCA and the CI engage in an interactive audio communication session;

determine a termination or suspension of the interactive audio communication session; and determine the non-audio mode based on the termination or suspension of the interactive audio communication session.

16. The system of claim 15, wherein the controller is further configured to:

inhibit the analysis of audio signals received via the microphone during the audio interaction mode.

17. The system of claim 14, wherein to determine the non-audio mode the controller is further configured to:

determine that an interactive communication session mode between the CCA and the CI utilizes communications other than audio communications.

18. The system of claim 17, wherein the interactive communication session mode comprises one of a chat communication session mode and an email communication session mode.

19. The system of claim 14, wherein:

the command indicated by the identified utterance comprises the predetermined subsequent action command; and generated the contact session metadata based on the command comprises inserting a post contact action indicator in the contact session metadata and identifying in the contact session metadata the predetermined subsequent action command.

20. A non-transitory computer-readable storage medium comprising a set of instructions which, when executed by a processing device, cause the processing device to carry out the steps of:

determining an initiation of a new contact session that includes a communication interaction between a contact center agent (CCA) having a microphone and a contacting individual (CI);

determining, prior to an end of the new contact session, a non-audio mode, wherein audio signals received by the microphone are not communicated to the CI;

analyzing audio signals received via the microphone during the non-audio mode;

identifying, based on analyzing the audio signals received via the microphone, an utterance spoken by the CCA and indicating one of a plurality of commands related to the contact session, the plurality of commands comprising a predetermined recording command and a predetermined subsequent action command, wherein the predetermined recording command comprises a command to generate a post interaction recording of audio signals, and wherein the predetermined subsequent action command comprises a command to take an identified additional action after an end of the communication interaction;

generating contact session metadata based on and including the recording command or the subsequent action command indicated by the identified utterance;

generating a contact session record that includes the contact session metadata; and storing the contact session record.

* * * * *